J. M. MERROW.
TRIMMING CUTTER FOR SEWING MACHINES.
APPLICATION FILED DEC. 9, 1905.
907,623.
Patented Dec. 22, 1908.
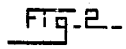
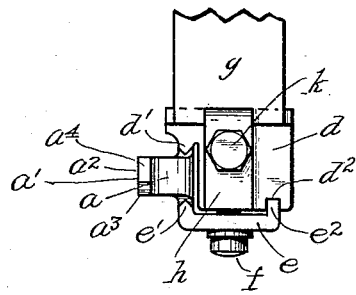
  
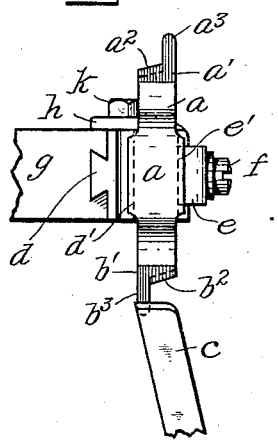 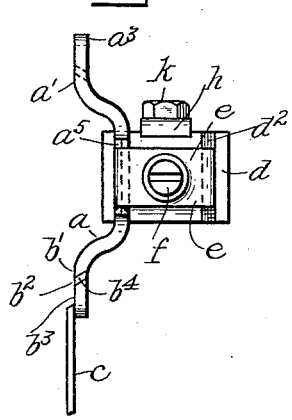 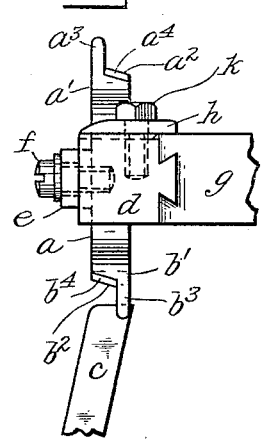
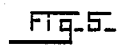
WITNESSES—
INVENTOR—
Joseph M. Merrow
BY Church & Church
his ATTORNEYS—

UNITED STATES PATENT OFFICE.

JOSEPH M. MERROW, OF HARTFORD, CONNECTICUT, ASSIGNOR TO THE MERROW MACHINE COMPANY, OF HARTFORD, CONNECTICUT, A CORPORATION OF CONNECTICUT.

TRIMMING-CUTTER FOR SEWING-MACHINES.

No. 907,623.　　　Specification of Letters Patent.　　　Patented Dec. 22, 1908.

Application filed December 9, 1905. Serial No. 291,136.

*To all whom it may concern:*

Be it known that I, JOSEPH M. MERROW, a citizen of the United States, residing in the city and county of Hartford, State of Connecticut, have invented certain new and useful Improvements in Trimming-Cutters for Sewing-Machines, of which the following is a full, clear, and exact description, reference being had to the accompanying drawings, forming a part of this specification, and to the figures and letters of reference marked thereon.

This invention relates to reversible trimming cutters and its object is to provide a trimming cutter having at each end a cutting edge with a guide or finger, each of these cutting edges with its guide being capable of being ground or dressed in a single plane and each of the cutting edges also being capable of being sharpened independently of its guide, said cutter also preferably being provided with means for accurately locating it and for giving direction for its adjustment on its support.

The cutter as shown when used with a suitable companion cutter, is well adapted for use with sewing machines to trim off the edge of the material.

In the accompanying drawings—Figure 1 is a front elevation, showing the cutter clamped on its holder and coacting with a companion cutter. Fig. 2 is a plan view of the parts shown in the Fig. 1 omitting the companion cutter, and shows also a portion of the carrier to which the cutter holder is adjustably secured. Fig. 3 is a side elevation of the parts shown in the Fig. 1 and includes also the carrier, the view being taken from the left of Fig. 1. Fig. 4 is a view similar to Fig. 3 but taken from the right of Fig. 1. Fig. 5 is a cross section at the center of the cutter.

Throughout the several figures of the drawings, like letters and numerals of reference denote the same parts.

Referring to the drawings:—The cutter, denoted as a whole by the letter $a$, is made preferably from a steel bar that is substantially rectangular in cross section. Its end portions $a'$ $b'$ are out of alinement with its central portion this result being secured by bending the end portions or a bar may be used of such thickness that its central portion may be cut out or relieved instead of being bent, the said end portions, however, in any event, preferably being substantially in alinement with each other.

The cutter $a$ is formed with a cutting edge $a^2$ and a guide $a^3$ at its end $a'$ and similarly, the end $b'$ is formed with a relatively inverted cutting edge $b^2$ and guide $b^3$. The cutting edges $a^2$ $b^2$ are preferably at an obtuse angle to their adjacent guides to produce a shearing coaction with the companion cutter $c$, and with which latter the guides are adapted to engage to effect a proper contact between the cutters, and further, the said cutting edges are preferably beveled as shown at $a^4$ $b^4$.

The ends $a'$ $b'$ of the cutter $a$ when made in a line with each other, may be ground or dressed simultaneously across their flat faces in a single plane, including the cutting edge and guide at each end of the cutter, and, as the bar is relieved between its ends, either by bending or cutting away, only comparatively small surfaces will necessarily be ground. If desired, the cutting edges may be sharpened upon their beveled surfaces $a^4$ $b^4$ instead of upon their flat faces which may be done to advantage when the cutting edge has become dull before the face of the guide has become unduly worn.

The cutter $a$ is adapted to be so supported that either of its ends may coact with the cutter $c$ which latter is also suitably supported, the ground or dressed face of the utilized end of the cutter $a$ engaging the adjacent face of the cutter $c$ which face is in substantially the same plane as the adjacent ground face of the cutter $a$ and in which plane the said end of the cutter moves. When one end of the cutter $a$ becomes dull or unfit for further use, the cutter is reversed to bring its opposite end into operative position and when both of its ends shall require grinding such operation may be simultaneously effected upon both ends as already explained.

To support the cutter $a$, the same is shown as adjustably clamped at the edges of its central portion between a holder $d$ and a clamp $e$ secured to the holder by a screw $f$, the adjustment being in a path parallel to the plane of the ground faces of the cutter. To give direction to this adjustment, rib and groove connection is provided between the cutter $a$, the holder $d$ and clamp $e$; the edges of the cutter being shown as having grooves $a^5$ and the holder and clamp respectively with ribs $d'$ $e'$. The guideways upon the edges of the cutter are also useful in holding the cutter while grinding the flat faces. The clamp $e$ is also further provided with a rib $e^2$ which is received in a groove $d^2$ in the holder $d$ and thus rotation of the clamp upon the screw $f$ when the latter is loosened is prevented.

The cutter $a$ is preferably somewhat wider at its central portion on which are the guideways than at its ends, thus permitting the cutter to be readily removed from or inserted between the holder and the clamp by sliding the same in the line of its guideways without the necessity of entirely removing the clamp.

The holder $d$ is adjustably secured to a carrier $g$ which latter may be suitably actuated to cause proper coaction between the cutters though it is immaterial which cutter is operated. The adjustment of the holder upon the carrier is lateral relatively to the adjustment of the cutter $a$ upon the holder $d$ and thus the desired contact of the cutter $a$ with the cutter $c$ may be readily attained. Preferably the carrier and holder are dovetailed together and the latter is retained in adjusted position upon the carrier by a clamp $h$ secured to the holder by a screw $k$ and adapted to be forced by the screw into clamping engagement with the carrier.

Having thus described my invention, what I claim as new and desire to secure by Letters Patent, is:—

1. A reversible cutter having at either end a face including a cutting edge and a guiding finger in a single plane, the central portion intermediate the end faces being in a plane below the plane of the faces of the ends, substantially as described.

2. A reversible trimming cutter having a cutting edge and a guide at each end and each end made in a single plane to include the cutting edge and the guide, said cutting edges also having bevel faces adapted to be ground independently of the guides to sharpen the edges, the body of the cutter between said ends being below the planes of the ends, substantially as described.

3. A reversible trimming cutter, having a cutting edge and a guide at each end in a single plane common to both ends said plane ncluding both the cutting edges and the guides, the body of the cutter having guiding surfaces in a plane parallel with the plane of the ends to permit of the adjustment of the cutter in a path parallel with the said plane of the ends; substantially as described.

4. A reversible trimming cutter having a cutting edge and a guide at each end in a single plane common to both ends the body of the cutter being below the plane of the ends and having guiding surfaces in a plane parallel with the plane of the ends to permit of the adjustment of the cutter in a path parallel with the said plane of the ends, substantially as described.

JOSEPH M. MERROW.

Witnesses:
ALONZO M. LUTHER,
W. C. W. STEWART.